US008909382B1

(12) United States Patent
Malakuti

(10) Patent No.: US 8,909,382 B1
(45) Date of Patent: Dec. 9, 2014

(54) OCCUPANCY DETECTION SYSTEM AND METHOD HAVING AUTOMATIC ADAPTATION CAPABILITIES

(75) Inventor: Kaveh Malakuti, Vancouver (CA)

(73) Assignee: Universal Lighting Technologies, Inc., Madison, AL (US)

( * ) Notice: Subject to any disclaimer, the term of this patent is extended or adjusted under 35 U.S.C. 154(b) by 440 days.

(21) Appl. No.: 13/293,281

(22) Filed: Nov. 10, 2011

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H01J 1/60 | (2006.01) |
| H01J 7/42 | (2006.01) |
| H05B 37/04 | (2006.01) |
| H05B 37/02 | (2006.01) |
| H05B 39/04 | (2006.01) |
| H05B 41/36 | (2006.01) |
| G08B 13/00 | (2006.01) |
| G08B 23/00 | (2006.01) |
| G01S 13/00 | (2006.01) |

(52) U.S. Cl.
USPC ........... 700/296; 700/291; 315/131; 315/360; 340/541; 340/573.1; 342/28

(58) Field of Classification Search
CPC ........ H05B 31/00; H05B 37/00; H05B 37/02; H05B 37/0227; H05B 37/0236; H05B 37/0245; H05B 37/0254; H05B 37/0263; H05B 37/0272; H05B 37/0281; Y02B 20/00; Y02B 20/40; Y02B 20/42; Y02B 20/44; Y02B 20/46; Y02B 20/48; Y02B 70/00; Y02B 70/10; Y02B 70/16

USPC .......... 700/286, 291, 295, 296; 315/131, 360; 340/500, 540, 541, 545.1, 573.1; 342/27, 28
See application file for complete search history.

(56) References Cited

U.S. PATENT DOCUMENTS

| 5,640,143 A | 6/1997 | Myron et al. |
| 5,699,243 A | 12/1997 | Eckel et al. |
| 5,946,209 A | 8/1999 | Eckel et al. |
| 5,986,357 A | 11/1999 | Myron et al. |
| 6,078,253 A | 6/2000 | Fowler |
| 6,151,529 A | 11/2000 | Batko |
| 6,415,205 B1 | 7/2002 | Myron et al. |
| 6,759,954 B1 | 7/2004 | Myron et al. |
| 7,884,727 B2 * | 2/2011 | Tran .......................... 340/573.1 |
| 8,502,456 B2 * | 8/2013 | Jarrell et al. .................. 315/131 |
| 8,538,596 B2 * | 9/2013 | Gu et al. ....................... 700/295 |

* cited by examiner

Primary Examiner — Crystal J Barnes-Bullock
(74) Attorney, Agent, or Firm — Waddey Patterson; Mark J. Patterson; Gary L. Montle

(57) ABSTRACT

An occupancy detection system includes a motion detector, one or more sound detectors and a lighting controller configured to turn on and off one or more lighting devices in a defined area based on detected occupancy states. Lighting control circuitry determines occupancy states based on motion detector output signals and sound detector output signals, and further controls associated lighting devices to be turned ON or OFF in accordance with determined occupancy states and an automatically adaptable timeout period. The timeout period is automatically adjusted in accordance with newly recorded time stamps for lighting status changes, based on a second order occupancy distribution analysis such as a Gaussian probability distribution function, with an occupancy curve adjusted for each newly recorded set of time stamps and the timeout period being adjusted according to the mean and variance of the occupancy curve.

18 Claims, 8 Drawing Sheets

OCCUPANCY DETECTION SYSTEM AND METHOD HAVING AUTOMATIC ADAPTATION CAPABILITIES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to devices, systems and methods for providing illumination control. More particularly, the present invention relates to systems capable of detecting a human presence and regulating an illumination level in a defined area, and adjusting the operating parameters to reduce false triggering events.

The use of occupancy sensors in lighting control has been on a steady rise as the industry advances towards more aggressive energy conservation measures. Conventional occupancy sensors are known which utilize various detection methods for detecting occupancy in a defined area. Among the known methods, passive infrared (PIR), microwave Doppler shift, ultrasonic Doppler shift, and audio sensors are the most common.

Passive infrared (PIR) sensors are considered to be the most common type of occupancy sensor. They are able to "see" heat emitted by occupants, and triggering occurs when a change in infrared levels is detected, such as when a warm object moves into or out of view with respect to the sensor's eyes. PIR sensors are very resistant to false triggering. Although some PIR sensors have an operating range of up to 35 feet in specific directions under ideal conditions, they are most reliable within a 15-foot range. This is due to the blind spots between their wedge-shaped sensory patterns becoming wider with increasing distance. The sensor is most sensitive to movements laterally across the field of view. They are passive, meaning that they do not send out any signal, and depend on the intensity of the heat from the moving part of the subject, which attenuates by the square of the distance.

PIR occupancy sensors typically use PIR elements having two to six sensing areas. The Fresnel lenses focus a projection of the defined area on the PIR element. The output of each sensing area on the PIR element is amplified electronically. Differential amplification is used so that a higher common-mode rejection ratio (CMRR) may be achieved. The CMRR is a measure the tendency of a device to reject input signals common to both input leads, and is defined as the ratio of the powers of the differential gain over the common-mode gain, as measured in positive decibels. In other words, differences between values of different areas of the PIR element are amplified and the common factor, which is present due to IR emissions from other surfaces and objects, is rejected in the amplifier. Thus, once a heat-emitting source crosses the sensitive areas, the projection is drifted from one PIR area to another. This will result in a pulse at the output of the amplifier. The pulse is then compared to a desired threshold to filter the effect of thermal and electronic noises. Various coverage patterns can be achieved via modifications to the construction of the Fresnel lens.

There has been an extensive amount of research and development conducted to implement and improve performance and accuracy of occupancy detection. Accordingly, various sensing technologies employ two or more detection methods in a single system in order to reduce false tripping. Dual technology occupancy sensors generally use an active sensing method in combination with a PIR element. Microwave and ultrasound are the most widely used technologies. Both methods rely on processing Doppler shifts between the frequency of the transmitted and reflected signals.

To achieve a completely passive dual technology sensor, a design as previously known in the art employs a PIR sensor as the primary main detection device and a microphone as a secondary detection device. This enhances the accuracy of the sensor through detecting spontaneous changes in the amplitude of the noise in the defined area. The signal from the microphone used in this sensor is amplified by an automatic gain control amplifier, and accordingly consistent background noises are filtered out. The microphone module is activated by the PIR module, or in other words the lights will be turned on when the PIR element senses a motion. Once in the ON state, either one of the PIR or microphone modules will keep the lights in the ON state. Once motion has not been sensed for a predetermined period of time (timeout), the lights will be put into the OFF state and a grace period timer will start. During this grace period, the lights could be reverted into the ON state by a signal from the microphone as well as from the PIR module. Once in the OFF state, the microphone will not regulate the lights into the ON state. It is the PIR module that reinitiates the ON state and also activates the microphone.

However, occupancy sensors and associated systems or networks as are conventionally known in the art still typically share a common failure with regards to false triggering of the various sensors. For example, sensors may fail to detect occupants and trigger the lights off while the area is still occupied. Ambient noise in a defined area may also be an issue for conventional systems, particularly infrequent sounds which are not necessarily cyclical and thereby easily distinguishable from occupancy in the area. In addition, where an array of microphones is used to detect sound in the defined area but the received sound signals are collectively analyzed as is typically known in the art, cross-correlation of the signals may be relatively low.

There are several examples previously known in the field of automatic sensor adjustments, such as performing the adjustments by adjusting the timeout, by adjusting the sensitivity of the first detection method, or adjusting the sensitivity of other detection methods, if applicable.

In one known method, a dual technology occupancy detector is presented with integrated light and temperature sensors. A self-test procedure is performed by the sensor in order to detect faults in the system and indicate such faults. The use of a 14-bit microcontroller with a built-in analog-to-digital converter (A/D) is provided for the purpose of processing the signals from the sensors. The sensor adjusts the sensitivity of the device by adjusting the gain of the amplifiers using historical data representing movements or occupancy signals. The sensor further measures the area of the room and adjusts the transmission power of an associated ultrasonic transmitter. Upon making a decision to switch the relays, latching is performed at the zero crossing point in time. Sensitivity adjustment is achieved by varying the threshold of the detection circuits. A vector based approach is utilized using a number of different sensors (e.g., PIR, ultrasonic, microwave, acoustic, photocell, etc.) and the result is fed to a detection algorithm for the purpose of determining the occupancy in the controlled area.

Other known methods relate to occupancy sensors with the capability of dynamically adjusting their timeout and sensitivity. The various sensors may adjust their timeouts dynamically by using the intervals between successive detected motions in a simple mathematical equation to derive the new timeout value.

BRIEF SUMMARY OF THE INVENTION

An occupancy detection system and method for controlling illumination in a defined area is provided in accordance with the present invention. In a particular aspect, the system and method control illumination generated by one or more lighting devices to regulate an amount of illumination (i.e., natural and artificial light) present in a defined area based at least in part on the use of statistical algorithms for determining and adjusting sensor parameters. As distinguishable from the use of linear mathematical equations for automatically adjusting sensor parameters such as has been studied and documented in prior art, systems and methods in accordance with the present invention may use second order statistical equations, which are not computationally intensive and could be performed by regular microcontrollers. Normal distribution may be assumed as the basis for determining the statistical parameters of the sensor operational variables.

In one embodiment, an occupancy detection system of the present invention includes a motion detector, one or more sound detectors and a lighting controller configured to turn on and off one or more lighting devices in a defined area based on detected occupancy states. The lighting controller determines occupancy states based on motion detector output signals and sound detector output signals, and further controls associated lighting devices to be turned on or off in accordance with determined occupancy states and an automatically adaptable timeout period. The timeout period is automatically adjusted in accordance with newly recorded time stamps for lighting status changes, based on a second order occupancy distribution analysis such as a Gaussian probability distribution function, with an occupancy curve adjusted for each newly recorded set of time stamps and the timeout period being adjusted according to the mean and variance of the occupancy curve.

In other embodiments in accordance with the present invention, an occupancy detection network includes a motion detection module and a sound detection module positioned in each of one or more defined areas. The detection modules are configured with control circuitry to generate an ON output signal when motion/sound is detected in an associated area during an OFF lighting state, and to generate an OFF output signal when a timeout period lapses with no motion/sound detected during an ON lighting state. Time stamps are recorded in association with motion/sound detection events, and the timeout periods are automatically adjusted upon recording new time stamps based on a second order occupancy distribution analysis further including each of the previously recorded time stamps. Each of the motion detection modules and sound detection modules are configured to be assigned an address associated with an area in which they are positioned, and a central lighting controller controls lighting devices in a given area to be turned on and off in accordance with output signals received from the associated detection modules.

DETAILED DESCRIPTION OF THE INVENTION

Figure 1:
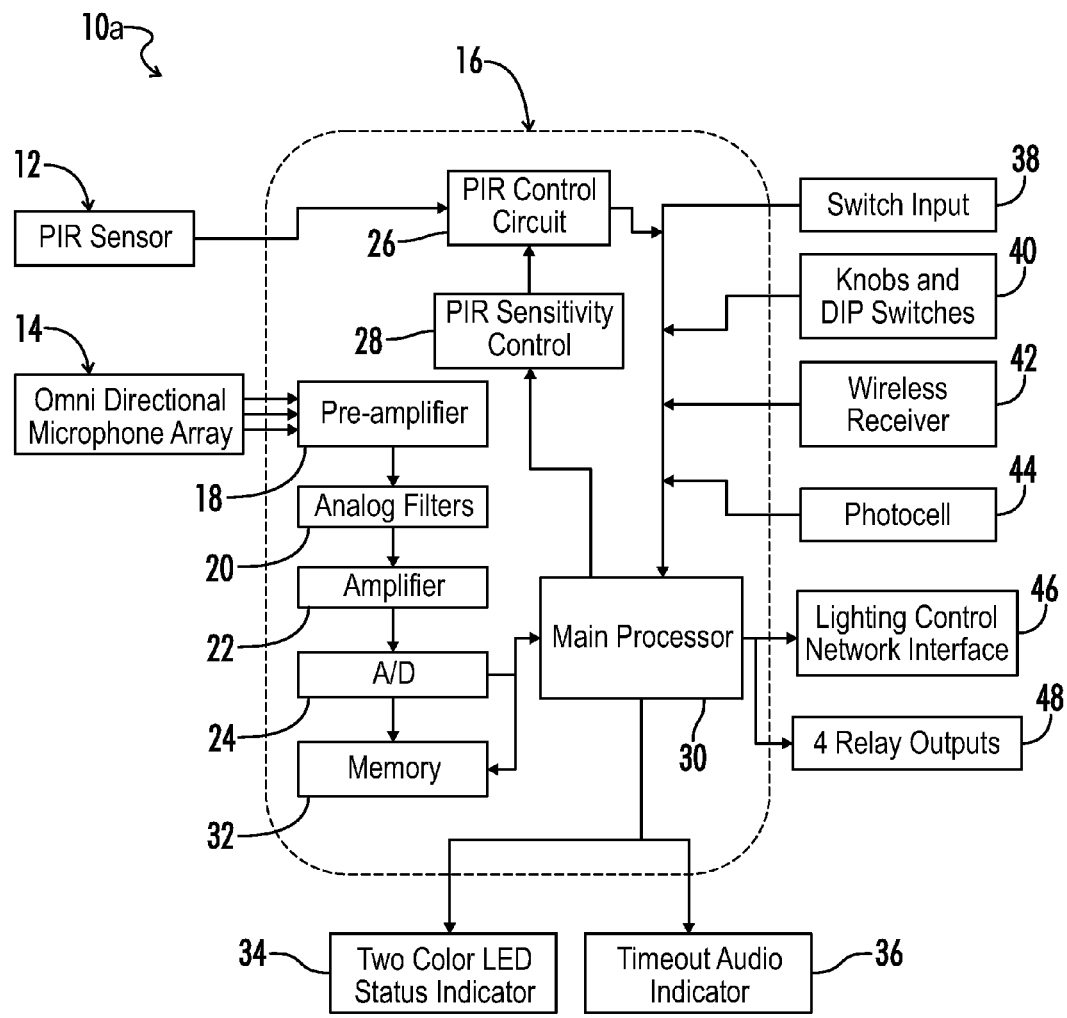
FIG. 1 is a block diagram of one embodiment of an occupancy detection system of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Generally stated, the term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least one current, voltage, charge, temperature, data or a state of one or more memory locations as expressed on one or more transmission mediums. Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-8, various embodiments of an occupancy detection system, occupancy detection network, and associated modular components, control circuitry and operating methods are described herein for controlling illumination from lighting devices in one or more defined areas. Where the various figures may describe embodiments sharing various common elements and features with other embodiments, similar elements and features are given the same reference numerals and redundant description thereof may be omitted below.

System and Network Structures

Referring first to FIG. 1, an embodiment of an occupancy detection system 10 in accordance with the present invention may include a motion detector 12 and one or more sound detectors 14 located in a defined area such as an enclosed interior space. A lighting controller 16 is configured to determine occupancy states associated with the detectors 12, 14 and to control one or more lighting devices in the defined area based on the determined occupancy states.

The motion detector 12 in various embodiments is a passive infra-red (PIR) sensor 12, but may be formed of various alternative and equivalent sensors as are known in the art within the scope of the present invention.

The sound detectors 14 in various embodiments can be a microphone array 14 effective to generate a plurality of output signals (or in equivalent manner a single multi-channel output signal). Each of the plurality of microphones in the array 14 may generally be omni-directional, but may alternatively be bidirectional, unidirectional or the like within the scope of the invention. The sound detectors 14 are further not limited to a microphone array 14, but may be formed of various alternative and equivalent sensors as are known in the art.

The terms "lighting controller" or "lighting control circuit" as used herein may refer to processing circuitry including one or more of a general microprocessor, an application specific integrated circuit (ASIC), a digital signal processor (DSP), a microcontroller, a field programmable gate array (FPGA), and/or various alternative blocks of discrete processing circuitry, and any pre-processing modules or other such circuitry as may be designed as is known in the art to perform functions as further defined herein. In an embodiment of the present invention, the controller 16 may be formed of processing circuitry and program instructions or firmware which is integrally embodied therewith. In other embodiments, the processing circuitry 30 may be separately embodied but functionally linked to a processor-readable memory medium 54 (see FIG. 2) having program instructions or firmware residing thereon and which is executable by the processor 30 to perform functions as further defined herein.

Figure 2:
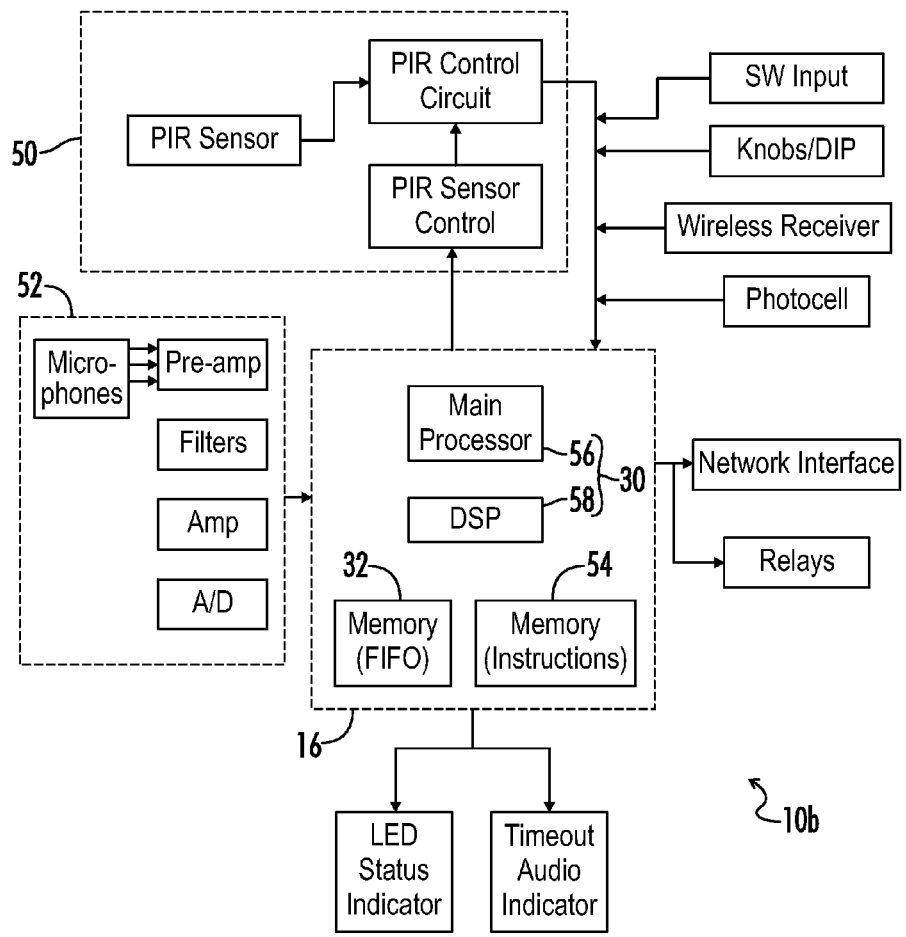
FIG. 2 is a block diagram of another embodiment of the occupancy detection system of FIG. 1.

As represented in FIG. 1 the lighting controller 16 may include a processor 30 and various discrete and functionally linked circuit components which receive and process information from the detectors 12, 14. In an alternative embodiment as represented in FIG. 2, certain of the components may physically reside or otherwise be functionally incorporated in separate modules 50, 52 associated with the detectors 12, 14 respectively and as further described below. The processor 30 may further be a single main processor 30 as represented in FIG. 1, or may, as represented in the embodiment of FIG. 2, be a combination of a control processor 56 which controls lighting output signals and various other functions of the system 10, and a digital signal processor (DSP) 58 which is configured to handle processing of input signals to the controller 16. The figures as may be understood by one of skill in the art are not exclusive of the various configurations and combinations that are possible, and other equivalent platforms are therefore considered within the scope of the present invention.

Referring again to FIG. 1, the lighting controller 16 may include a pre-amplifier 18 coupled to receive the plurality of output signals (or alternatively stated the single multi-channel output signal) from the sound detectors 14, analog filters 20, an amplifier 22, an analog-to-digital (A/D) converter 24, a memory medium 32, and the processor 30. In an alternative embodiment as represented in FIG. 2, the various circuit components 18, 20, 22, 24 as shown in FIG. 1 may, along with the sound detectors 14, define a sound detection module 52, which may for example reside in a common housing external to a housing associated with the lighting controller 16.

Figure 4:
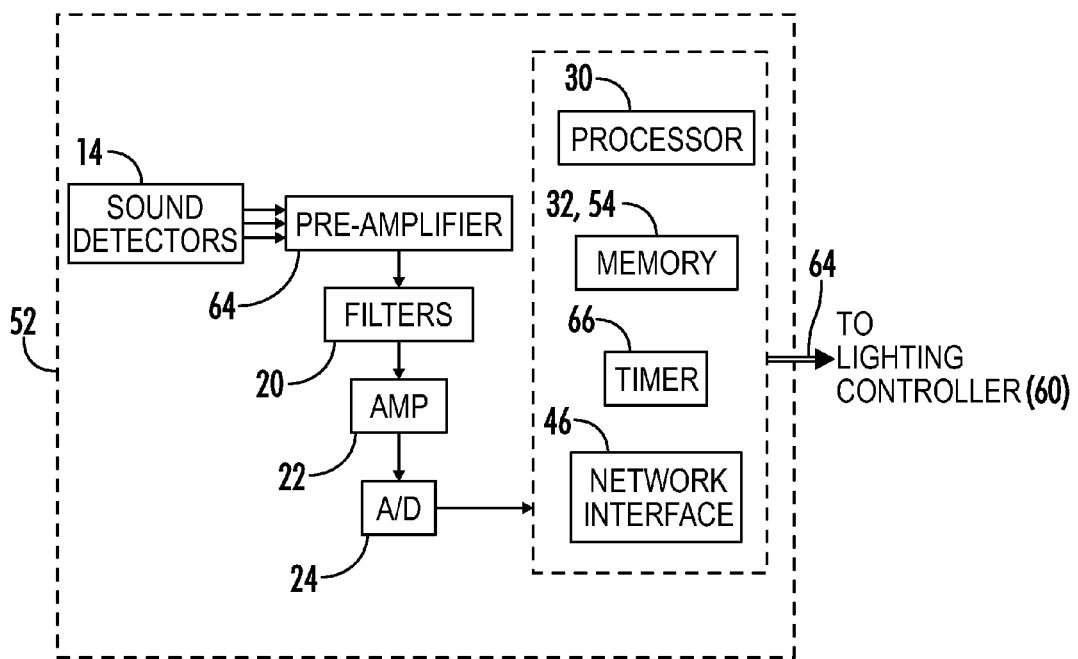
FIG. 4 is a block diagram representing an embodiment of a sound detection module for the occupancy detection network of FIG. 3.

A "sound analyzer feature" or "sound analyzing process" as referred to herein may generally include the various sound signal analyzing functions as further described below to process data provided from the analog sound detection circuitry 14, 18, 20, 22, 24 (or sound detection module) when so enabled by the lighting controller. Accordingly, a "sound analyzer circuit" as referred to herein may generally be formed by the processor or a combination of circuit components including the processor and caused by firmware or instructions residing on memory in the lighting controller to perform the various steps of the sound analyzing feature. In an alternative embodiment as represented in FIG. 4, a sound detection module 52 as referred to above with respect to FIG. 2 may further include the sound analyzer circuit to collectively define sound detection control circuitry effective to generate output signals to a central lighting controller in an occupancy detection network as described further below.

The lighting controller 16 as represented in FIG. 1 may also include a motion detection control circuit 26 coupled to receive the output signal from the motion detector 12, and a motion detector sensitivity control circuit 28. In an alternative embodiment as represented in FIG. 2, the circuits 26, 28 may along with the motion detector 12 define a motion detection module 50, which may for example reside in a common housing external to a housing associated with the lighting controller 16.

The lighting controller 16 may further be coupled to receive one or more of various input signals from sources such as a manual switch input 38, various knobs and DIP switches 40 associated with the controller 16, a wireless receiver 42, and an ambient light detector such as a photocell 44. The controller 16 may be effective to perform various functions as further defined below in accordance with the received signals, and to generate output signals for one or more external devices. The external devices may include, for example, an LED status indicator 34, a timeout audio indicator 36, a lighting control network interface 46 and relay outputs 48. A lighting controller 16 of the present invention may accordingly be integrated with an existing lighting network including a motion detector, sound detectors and one or more lighting devices driven on and off via one or more of the aforementioned output signals (or alternatively via signals or pulses provided by an external and intermediate device which is configured to receive one or more the aforementioned output signals).

Figure 3:
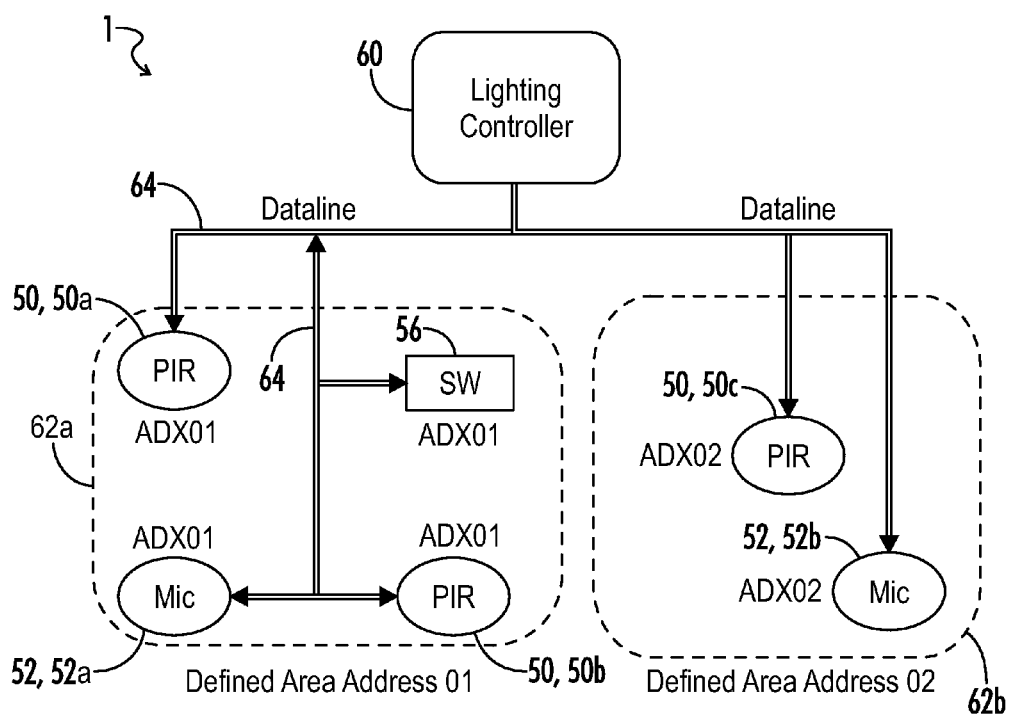
FIG. 3 is a block diagram representing an embodiment of an occupancy detection network in accordance with the present invention.

Referring now to FIG. 3, an embodiment of an occupancy detection network 1 may include one or more motion detection modules 50 and sound detection modules 52 residing in various locations within each of a plurality of defined areas 62, each defined area being assigned an address which is further assigned to each associated detection module 50, 52. The motion detection modules 50 and sound detection modules 52, along with any manual switches 56 further located in one or more of the defined areas 62, may be electrically coupled to a central lighting controller 60 via a data communications line 64. In an alternative embodiment, a plurality of motion detection modules 50 may be positioned in a particular area without including any sound detection modules 52.

In various embodiments the data communications line 64 as used herein with respect to data communication between the various elements may generally refer to a wired bidirectional data bus, but alternatively or in addition may refer to any wired or wireless networks, network links and intermediate communication interfaces effective to transmit and receive data as required in accordance with the features defined below.

As the occupancy detection network 1 may generally include a central lighting controller 60, the various motion and sound detection modules 50, 52 may for better efficiency include internal control circuitry to perform certain functions, rather than relying on a separate local controller to interface with the central controller. As represented in FIG. 4, a sound detection module 52 may include one or more sound detectors 14 and analog sound detection circuitry 18, 20, 22, 24 as described above, as well as sound analyzer circuitry 30, 32, 54, 66, 46 which would otherwise reside in or in association with the lighting controller 16, and the functionality of which will be described in greater detail below.

First Exemplary Occupancy Detection Process

Figure 5:
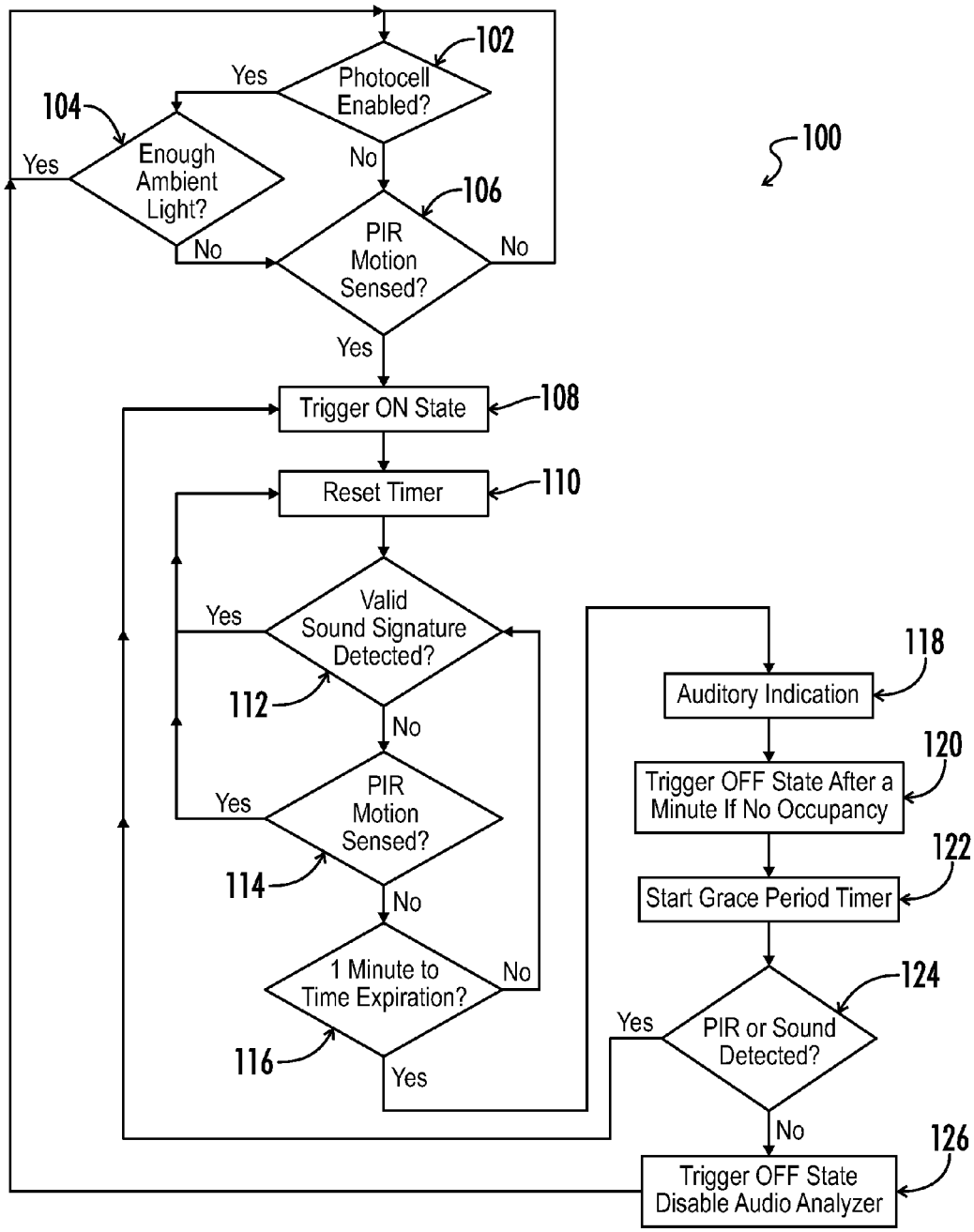
FIG. 5 is a flowchart representing an exemplary occupancy detection method in accordance with the present invention.

Referring to FIG. 5, an operational method 100 or process 100 may now be described in accordance with an exemplary embodiment of an occupancy detection system 10 of the present invention.

A first step 102 may include determining whether or not an ambient light detector or photocell 44 (optional) is coupled to the lighting controller 16 and enabled. If an ambient light detector is not included in the system 10 or otherwise is disabled (i.e., "no" in response to the query of step 102), the process continues to step 106.

Otherwise, where an ambient light detector (e.g., a photocell) is included in the system 10 and enabled (i.e., "yes" in response to the query of step 102), the lighting controller may determine based on an input from the ambient light detector whether or not an adequate amount of ambient illumination is present in the defined area (or a portion thereof accessible by the light detector). If the defined area is determined to already have an adequate level of ambient illumination (i.e., "yes" in response to the query of step 104), the process returns to step 102 and repeats periodically until either the ambient light detector is disabled or the condition is not met (i.e., "no" in response to the query of step 104).

When the defined area is determined to not have adequate ambient illumination, the process continues to step 106 and the lighting controller determines a first occupancy state based on a received motion detector output signal from the motion detector 12. In an embodiment wherein the motion detector 12 is a PIR sensor, a first occupancy state may be associated with temperature changes induced by the motion of occupants across one or more sensing regions, or alternatively a lack thereof.

When the lighting controller determines the first occupancy state to be representative of no human occupancy in the defined area, or in other words does not receive a valid motion detection signal from the motion detector 12 (i.e., "no" in response to the query of step 106), the process returns to step 102 and repeats from the beginning.

When the lighting controller determines the first occupancy state to be representative of human occupancy in the defined area, or in other words receives a valid motion detection signal from the motion detector 12 (i.e., "yes" in response to the query of step 106), the processor triggers an ON state in associated lighting devices or otherwise controls one or more lighting devices in the defined area to be turned ON (step 108). In various embodiments the lighting devices may be triggered directly by output signals from the lighting controller, or alternatively the lighting controller may generate output signals to an intermediary controller or network interface which further controls lighting devices in a plurality of defined areas or portions thereof.

After the lighting devices have been controlled (directly or indirectly) to be turned ON, the lighting controller may enable a sound analyzer feature and reset an internal timer (step 110). The internal timer may be configured to determine the lapsing from a reset condition of a predetermined and adjustable period of time, during which the lighting controller determines first and second occupancy states associated with the defined area in accordance with received detection signals from either or both of the motion detector and the sound detectors (steps 112 and 114). The lighting controller may generally be described as enabling the sound analyzer feature by enabling the processing and analysis of sound samples which are continuously being collected regardless of whether the sound analyzer feature is enabled. In certain embodiments the lighting controller may enable or disable the sound analyzer feature in any number of equivalent manners including for example enabling and disabling the sound detectors themselves.

If a valid detection signal is received from the sound detectors, or a second occupancy state is otherwise determined based on analysis of sounds in the environment of the defined area and extracted sound signatures to be representative of human occupancy (i.e., "yes" in response to the query in step 112), the process returns to step 110 to reset the timer and repeat.

If a valid detection signal is not received from the sound detectors, or a second occupancy state is otherwise determined based on analysis of sounds in the environment of the defined area and extracted sound signatures to not be representative of human occupancy (i.e., "no" in response to the query in step 112), the process continues to step 114 and determines if a valid detection signal is or has been received from the motion detector during the period of time since resetting of the timer. If a valid detection signal is received from the motion detector (i.e., "yes" in response to the query in step 114), the process returns to step 110 to reset the timer and repeat.

If no valid detection signal is received from the motion detector (i.e., "no" in response to the query in step 114), the lighting controller may in various embodiments determine if a predetermined timeout warning period has been entered. This period may be, for example, one minute prior to lapsing of the predetermined timeout period measured from resetting of the timer, or alternatively may begin upon lapsing of the predetermined timeout period and extend for one minute afterwards. If the predetermined timeout warning period has not been entered (i.e., "no" in response to the query in step 116), the process returns to step 112 and repeats.

If the predetermined timeout warning period has been entered (i.e., "yes" in response to the query of step 116), for example where the lighting controller determines that one minute or less remains until expiration of the predetermined timeout period, the lighting controller may in various embodiments generate an output signal to a timeout audio indicator (in step 118) such that an auditory indication is provided to warn any occupants of the room that they are not being detected by the various sensors and accordingly by the occupancy detection system.

After lapsing of the predetermined timeout period and/or the predetermined timeout warning period, if no valid detection signals have been received in association with either of the motion detector or the sound detectors, the lighting controller triggers an OFF state in the associated lighting devices or otherwise controls one or more lighting devices in the defined area to be turned OFF (step 120). At this time the lighting controller may further initiate a grace period timer (step 122) associated with a predetermined and adjustable grace period of time during which both the motion detector and the sound detectors remain enabled and active. If a valid detection signal associated with the first occupancy state or a valid sound signature associated with the second occupancy state is determined by the lighting controller during the grace period of time (i.e., "yes" in response to the query of step 124), the process returns to step 108, triggers or otherwise controls the lighting devices to be turned ON, and repeats the subsequent steps as detailed above.

If a valid detection signal is not received from either the motion detector or the sound detectors during the grace period, or in other words if first and second occupancy states are otherwise determined based on processed PIR signals and analysis of sounds in the environment of the defined area and extracted sound signatures to not be representative of human occupancy (i.e., "no" in response to the query in step 124), the processor of the lighting controller disables the sound analyzer circuit (or sound detection module) such that no output signals are received from the sound detectors and a second occupancy state is no longer determined by the lighting controller (step 126).

After the sound analyzer feature (and/or sound detection module) has been disabled, the process returns to step 102 and repeats the various subsequent steps as detailed above, wherein a valid detection by the motion detector is required to trigger or otherwise control lighting devices to be turned ON.

Automatic Adaptive Timeout Adjustment

The "predetermined" timeout period as referred to above may in various embodiments be better described as having been previously determined based on identified occupancy patterns. Any one or more of, for example, the lighting controller 16 (see FIG. 1), the motion detection module 50 (FIGS. 2 and 3) and the sound detection module 52 (FIGS. 2, 3 and 4) may include program instructions executable to automatically adjust the associated timeout period in an adaptive fashion with respect to detected occupancy states. In this example, however, the timeout adjustment will be performed by the lighting controller 16 in the occupancy detection system 10 as represented in FIG. 1, and the other examples may be further understood as being performed in an analogous manner unless otherwise stated or provided for herein. The timeout period adjustments in accordance with the present invention may generally and preferably be achieved using relatively simple statistical processes which are not burdensome on the associated control circuitry and otherwise may be implemented without substantial cost or effort.

Figure 6:
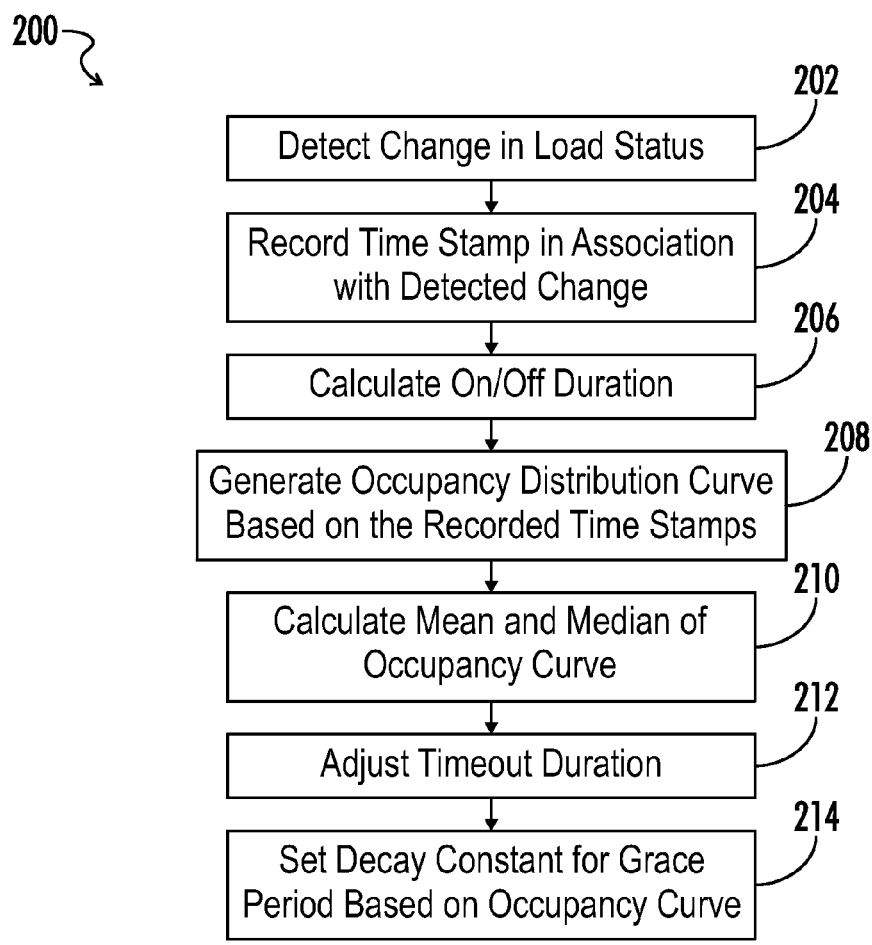
FIG. 6 is a flowchart representing an exemplary automatic adaptive timeout adjustment method in accordance with the present invention.

Referring to FIG. 6, an exemplary timeout adjustment method 200 includes a first step 202 of detecting status changes, or in other words detecting changes in the status of associated lighting devices from ON to OFF or OFF to ON, or alternatively detecting events such as output signals from individual detectors representative of load status changes. A timer records time stamps (in step 204) in association with the detected events, which are later to be analyzed. ON durations and OFF durations may be derived using simple mathematics (step 206).

The results may be assumed to have a second order normal distribution pattern, such as a Gaussian probability density function (PDF), as embodied by occupancy distribution curves having a mean µ and a variance σ which may be generated based on the recorded time stamps in a manner well known in the art (step 208). This assumption is arguably valid due to the random nature of the distribution of the occupancy durations. In this particular example two or more PDFs may be provided based on events associated with the respective detectors, but where the analysis is conducted within a given module it may be understood that one PDF analysis is sufficient for the associated occupancy status readings.

Once the coefficients of the PDFs are calculated, an optimization algorithm may be executed (step 210) to adjust the associated occupancy distribution curves in light of a predetermined goal (parameters, criteria, etc.). For example, with the purpose of increasing light fixture life and/or maintaining maximum energy savings, the mean and median of the occupancy curve (i.e., µ) is derived such that the variance times two ($2\sigma^2$), which covers roughly 95% of the PDF, is less than the mean. The timeout duration may then be adjusted in accordance with the derived values such that for example time stamps representing an ON duration lower than the previously derived mean have the effect of reducing the timeout duration, and time stamps representing an ON duration greater than the previously derived mean have the effect of increasing the timeout duration. Each new time stamp value may trigger a reevaluation of the occupancy distribution curves, which affects the derived values of the mean and variance, and subsequently the timeout duration (step 212).

In embodiments of the present invention wherein a grace period is utilized, the grace period may further be automatically and continuously adjusted with each new time stamp or set of time stamps in an analogous manner to that described above. As one example, after the timeout period lapses and the load is switched OFF (see steps 120 and 122 above), the gain of the acoustic amplifier 22 associated with the sound detectors 14 (or the sound detection module 52) may be constantly decreased in accordance with an exponential decay curve. The decay constant for the curve may be derived from the variance σ of the timeout timer (step 214).

In an embodiment within the scope of the present invention, a similar approach may be utilized for determining the acoustic gain in accordance with the mean derived from time stamps associated with sound detection output signals. The effect may be the same or equivalent whether the acoustic amplifier 22 resides in the lighting controller 16 (FIG. 1) or sound detection module 52 (FIG. 2 or 4).

Likewise, in embodiments of the present invention motion detection sensitivity control circuitry may be effective to determine the level of a sensitivity threshold for the motion detector (PIR) using the same or equivalent approach. The effect may be the same or equivalent whether the motion detection sensitivity control circuitry resides in the lighting controller 16 (FIG. 1) or motion detection module 50 (FIG. 2).

Sound Analyzing Process

Figure 7:
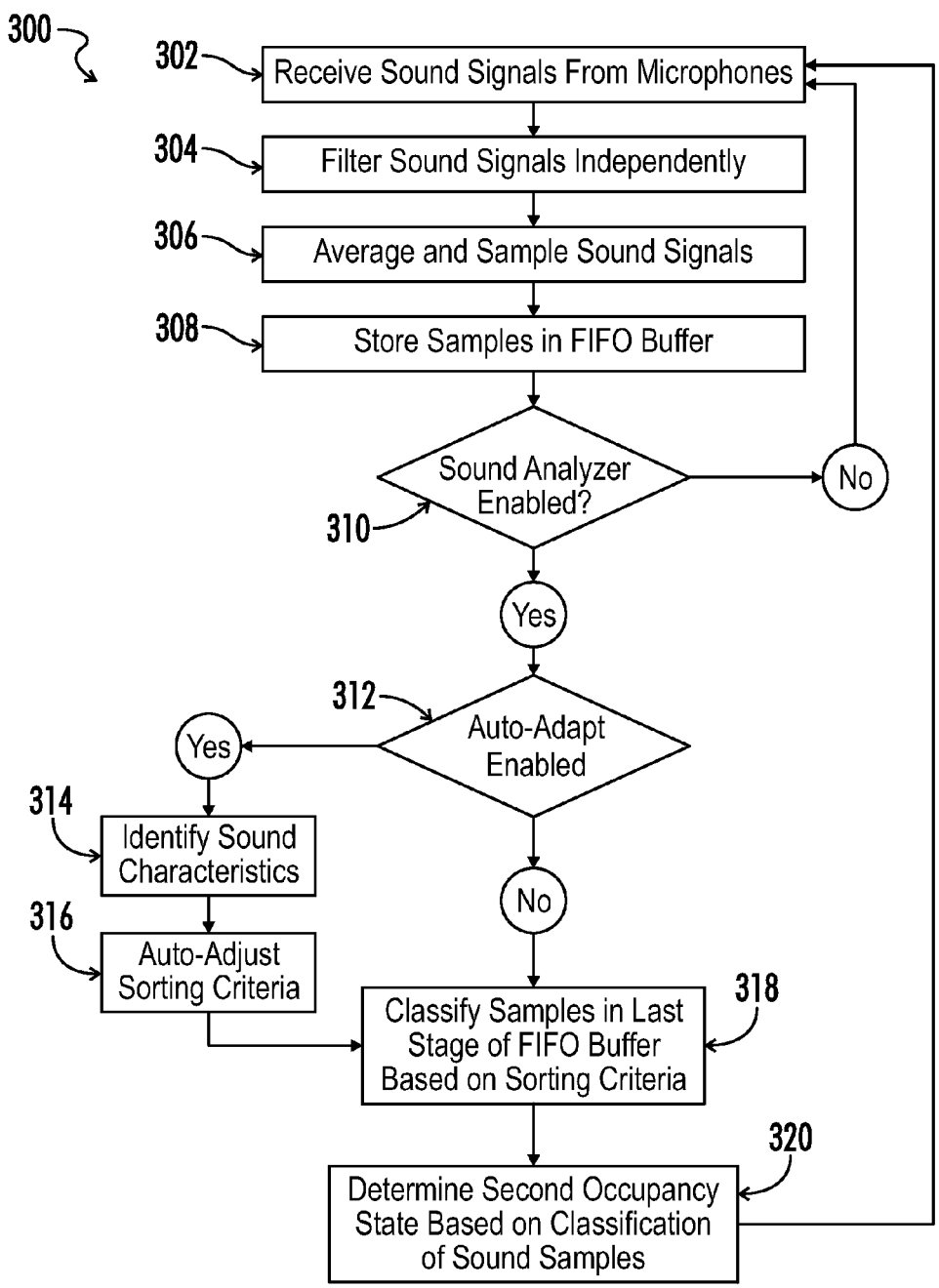
FIG. 7 is a flowchart representing an exemplary sound analyzing method in accordance with the present invention.

Referring now to FIG. 7, an embodiment of a method 300 for determining an occupancy state based on output signals from the one or more sound detectors may now be described. As previously noted, in various embodiments the process or method 300 may be performed entirely by components associated directly with the lighting controller, while in alternative embodiments one or more of the steps in the process 300 may be performed by components associated with a sound detection module 52 and which may or may not reside in a common housing with respect to the lighting controller and more particularly with an associated processor.

Generally stated, a method 300 in accordance with a sound analyzer feature of the present invention extracts sound signatures from ambient noises using mathematical transformations. Mathematical decision-making algorithms are provided to cluster sounds into occupant- or non-occupant-caused sound clusters, such that a second occupancy state associated with the sound detectors is representative of either human occupancy or the lack thereof.

In a first step (step 302), output signals from the plurality of sound detectors (e.g., omnidirectional microphones) representative of ambient sounds in a defined area are received by analog sound analyzing circuitry. As shown in FIG. 1 and previously described, the analog circuitry may collectively reside in association with the lighting controller, but may alternatively reside in a sound detection module or housing alongside or otherwise proximate the sound detectors themselves (see FIG. 4). In various embodiments the plurality of sound detector outputs are provided as independent channels of an input signal to a pre-amplifier circuit 18 and pre-amplified individually.

The individual pre-amplified sound signals may then (in step 304) be provided to one or more analog filters and independently filtered to attenuate frequencies outside of a predetermined range. In one embodiment, the analog filters used in this process are of the band-pass type and attenuate frequencies above or below first and second filter thresholds, respectively, to eliminate low and high frequency interferences otherwise present in the environment. These first two steps may in certain embodiments be optional based on expected levels of undesirable ambient noises present in sound samples and/or the need to reduce computational loads in the processing circuitry of the lighting controller.

The filtered sound samples may then pass through an acoustic amplifier having a gain which may, in certain embodiments, be adjustable in accordance with identified sound/occupancy patterns as previously described with respect to the adaptive timeout process of the present invention.

The multiple filtered channels of sound may then be averaged and then sampled (step 306) using, for example, a 10-bit analog-to-digital converter (A/D) 20. The A/D 20 in one embodiment may take 36,000 samples per second of ambient sounds in the defined area or otherwise proximate the plurality of sound detectors.

The samples are then sent to and stored in a memory 32 via the main processor (step 308). The memory in one embodiment is capable of storing up to four seconds' worth of sound samples, and may accordingly function in a manner known in the art as a first-in first-out (FIFO) buffer for the sound samples.

In an embodiment, at each moment in time that the sound analyzer (or alternatively the sound detection module) is enabled, the last second of samples are used to determine a second occupancy state in the defined area (a first occupancy state being determined based on the motion detector output signals as previously described) based on the sound signatures present in the samples. If the sound analyzer (or sound detection module) is determined to be enabled (i.e., "yes" in response to the query of step 310), for example based on signals received from the motion detector as previously described with respect to the operational method 100, the process continues to step 312. Otherwise, where the sound analyzer is determined to be disabled (i.e., "no" in response to the query of step 310), the process returns to step 302 and repeats.

In various embodiments, the lighting controller may include an auto-adapt feature which adapts the sound analyzer to the environment in a defined area over time by varying coefficients or sorting criteria which are used to determine the occupancy state. The auto-adapt feature may be disabled via, for example, manual manipulation of DIP switches coupled to the lighting controller.

If the auto-adapt feature is disabled (i.e., "no" in response to the query of step 212), or otherwise not enabled such as for example where not included or otherwise available in the lighting controller, the process continues to step 318. The subsequent steps may then be performed using sorting criteria which in various embodiments may be sorting criteria initially provided with the lighting controller, current user settings, or alternatively the last auto-adapted sorting criteria prior to the auto-adapt features having been disabled.

If the auto-adapt feature is enabled (i.e., "yes" in response to the query of step 312) the processor may identify and "learn" sound characteristics in the defined area which are associated with regular occupancy. If a sound has been detected frequently while the motion detector has likewise sensed occupancy, the auto-adapt feature may learn the sound and cluster it as a valid occupancy sound signature for use at a later time. With respect to the steps of the method 300 as represented herein, the auto-adapt feature in step 314 identifies sound characteristics for the sound samples stored in the last stage FIFO buffer and in step 316 automatically adjusts the coefficients in the sound analyzer and thereby the sorting criteria in accordance with the identified sound characteristics.

As a practical matter, the auto-adapt process takes place over an extended period of time as sound samples accumulate and sound signatures can be identified and properly clustered, meaning that an identification of sound characteristics and an automatic adjustment of the sorting criteria will generally not be performed with each cycle of the method 300. Rather, the auto-adapt process of the sound samples as they are collected, stored and analyzed takes place substantially continuously when enabled, and coincident with determination of the second occupancy state.

In one embodiment, the auto-adapt process is implemented using an Artificial Neural Network (ANN) routine. The last second of sound samples may be loaded into the processor when the sound analyzer is enabled and accordingly fed into a first layer of the ANN. An ANN as known in the art is a mathematical model or computational model that is inspired by the structure and/or functional aspects of biological neural networks. It consists of an interconnected group of artificial neurons and processes information using a connectionist approach to computation. In many cases an ANN is an adaptive system that changes its structure based on external or internal information that flows through the network during the learning phase. Modern neural networks are non-linear statistical data modeling tools. They are usually used to model complex relationships between inputs and outputs or to find patterns in data.

The particular type of ANN and associated mathematical algorithms relied upon in the embodiment may vary within the scope of the present invention, and various such routines as are presently known in the art may be provided to perform the sound analyzing steps defined herein.

In certain embodiments, another application of the auto-adapt feature may be adjusting the timeout period of the system. An example could be a storage room where a default timeout is set to fifteen minutes during a commissioning process for the system. The sound detection module or lighting controller may recognize that the room has always been occupied for less than five minutes, and intervals between occupancies have been considerably longer than the timeout itself. The auto-adapt feature here may regulate the timeout period gradually and continue to adjust itself over time if there are further changes in the occupancy pattern of the defined area.

Referring now to step 318, features or sound signatures associated with the last second of sound samples in the FIFO buffer may be classified based on the sorting criteria. The second occupancy state may then be determined in step 320 based on the classification of the sound samples as relating to occupancy of the defined area or merely ambient sounds within the scope of the default sorting criteria or as learned by the system from previous experience.

Second Exemplary Occupancy Detection Process (Network)

Figure 8:
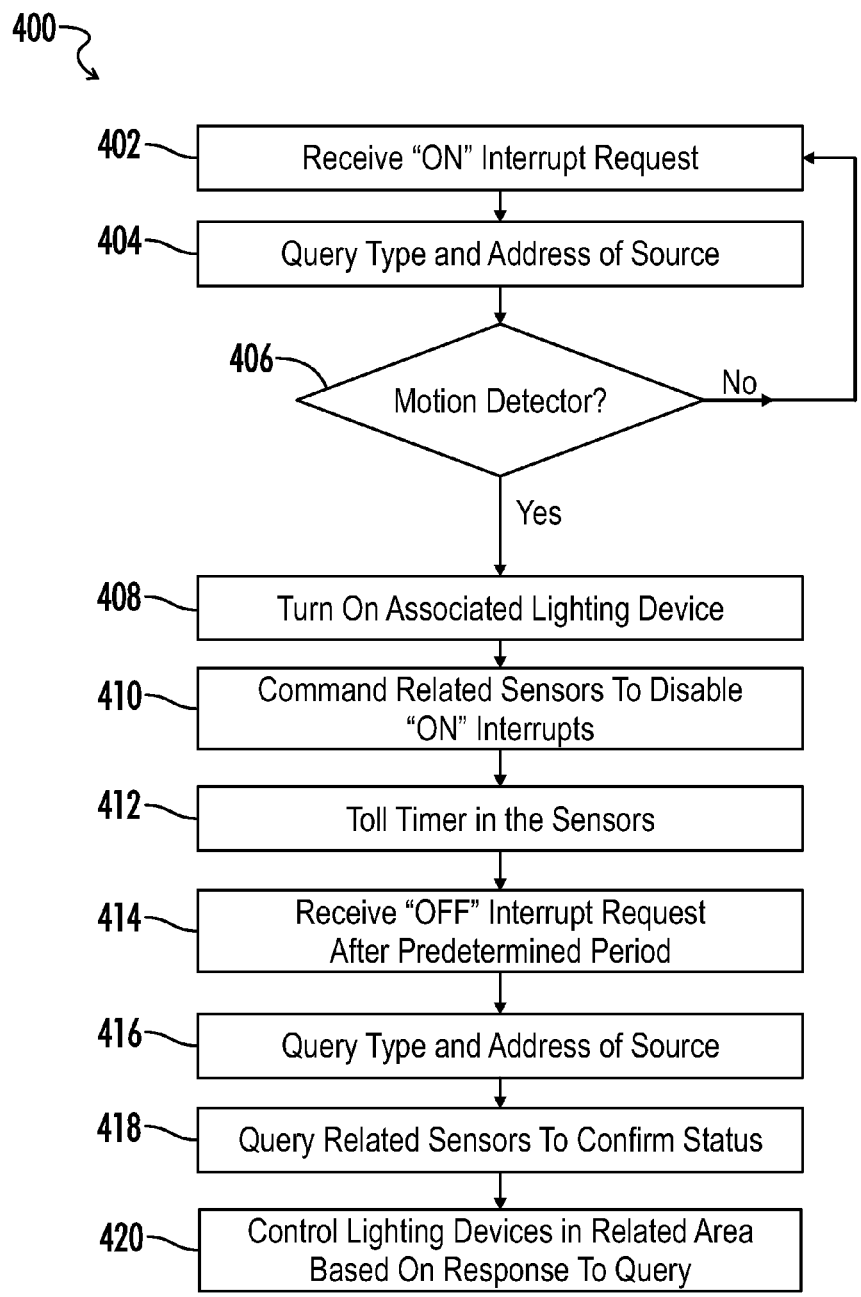
FIG. 8 is a flowchart representing an exemplary network lighting control method in accordance with the present invention.

Referring now generally to the occupancy detection network 1 of FIG. 4, an embodiment of a method 400 as further represented in FIG. 8 for controlling illumination in a plurality of defined areas having occupancy detectors positioned therein may now be described. The method 400 may be described herein with respect to one (e.g., 62*a*) of a plurality of defined areas 62 associated with a lighting controller 60, with the understanding that the operational method for each defined area 62 is substantially similar although varying potentially with respect to the number and type of detection modules located therein.

With the lighting devices in a particular defined area 62*a* initially turned off, each detection module 50, 52 in the area is configured to determine an occupancy state and to accordingly generate and transmit an ON interrupt request to the lighting controller 60 upon first detection of a human presence in the OFF state. The interrupt request (ON or OFF) may be equivalent to an input signal received a manual wall switch with respect to the central controller, or may alternatively be embodied as part of a data string or data package wherein the central controller determines the interrupt request via decoding of the input data. The central lighting controller receives the ON interrupt request (step 402) and subsequently queries each detection module in the network to determine a type and address of the source (step 404). In an embodiment, these first two steps 402, 404 may be performed in a single step with respect to the source module where for example the ON interrupt request may be provided as part of a data string that includes the type and address of the source module.

If the lighting controller determines that the source of the ON interrupt request is not a motion detection module (i.e., "no" in response to the query of step 406), the process returns to step 402 and repeats until another ON interrupt request is received by the controller.

In an embodiment (not shown), the lighting controller may first query other detection modules in the defined area to determine if any motion detection modules are in an ON state (indicating that motion associated with a human presence has been detected). If at least one motion detection module is determined to be in the ON state, the process continues to step 408 rather than returning to step 402.

If the lighting controller determines that the source of the ON interrupt request is a motion detection module (i.e., "yes" in response to the query of step 406), the lighting controller responds by turning on one or more lighting devices (or cause them to be turned on by generating driver signals to an intermediary control device) which are located in or otherwise provide illumination for the defined area associated with the address of the source module (step 408).

Once in the ON state, the lighting controller may then generate and issue a command to each detection module having the same address to disable or otherwise not generate further ON interrupt requests (step 410). Each detection module upon receiving the command further may toll an internal timer that is set to expire after an adjustable predetermined period of no detected activity in the defined area that may be associated with human occupancy (step 412). Upon expiration of the predetermined period of time, the detection module is configured to send an OFF interrupt request to the lighting controller (step 414). As previously described, the OFF interrupt request may take the form of an input signal received from a manual wall switch with respect to the central controller, or may alternatively be embodied as part of a data string or data package wherein the central controller determines the interrupt request via decoding of the input data.

The lighting controller then queries the network for the type and address of the source of the OFF interrupt request (step 416). In an embodiment, steps 414 and 416 may be performed in a single step with respect to the source module where for example the OFF interrupt request may be provided as part of a data string that includes the type and address of the source module. Once the address of the source has been determined, the lighting controller queries the status and type of each other detection module having the same address as the source module (step 418). The "status" as referred to herein may generally be defined as an ON status associated with an occupancy state or otherwise a detected human presence in the defined area, or an OFF status associated with a non-occupancy state or otherwise no detected human presence in the defined area.

Based on responses to the query of step 418, the lighting controller may then control the one or more lighting devices associated with the defined area to be turned off or left on (step 420).

In one example of step 420, the lighting devices associated with a defined area are presently in an ON state. A sound detection module sends an OFF interrupt request to the lighting controller, which then queries other detection modules in the defined area. If at least one motion detection module in the defined area is in the ON state (indicating that motion associated with a human presence has been detected), the lighting devices are kept ON by the controller. Alternatively, if all motion detectors in the defined area are determined to be in the OFF state, the lighting controller controls the lighting devices (either directly or via an intermediate driver circuit as previously noted) to be turned OFF. This step may for example be performed regardless of confirmation with regards to other sound detection modules in the defined area.

The previous detailed description has been provided for the purposes of illustration and description. Thus, although there have been described particular embodiments of the present invention of a new and useful "Occupancy Detection System and Method Having Automatic Adaptation Capabilities," it is not intended that such references be construed as limitations upon the scope of this invention except as set forth in the following claims.

What is claimed is:

1. An occupancy detection system comprising:
a motion detector effective to provide an output signal based on detected motion in a defined area;
a sound detector effective to provide an output signal based on detected sound in the defined area; and
a lighting controller effective to
determine a first occupancy state based on a received motion detector output signal and a second occupancy state based on a received sound detector output signal,
control one or more associated lighting devices to be turned from OFF to ON in accordance with a determined first occupancy state of ON,
control the lighting devices to be turned from ON to OFF in accordance with determined first and second occupancy states of OFF for longer than a timeout period,
record time stamps in association with events causing the lighting devices to be turned OFF and in association with events causing the lighting devices to be turned ON, and
automatically adjust the timeout period upon receiving new time stamps based on a second order occupancy distribution analysis including each of the recorded time stamps and comprising an occupancy curve having a mean and a variance associated with a Gaussian probability distribution function, the occupancy curve being adjusted for each newly recorded set of time stamps and the timeout period being adjusted according to the mean and variance of the occupancy curve.

2. The system of claim 1, the second order distribution analysis comprising calculating the occupancy curve wherein the mean is greater than two times the variance.

3. The system of claim 1, the controller further effective to toll a grace period in response to determined first and second occupancy states of OFF throughout the duration of the timeout period, and
control the one or more lighting devices to be turned ON in response to a determined first or second occupancy state of ON during the grace period.

4. The system of claim 3, further comprising an acoustic amplifier associated with the sound detector and having a gain configured to constantly decrease along a decay curve upon tolling of the grace period, wherein the duration of the grace period is determined by a decay constant associated with the gain.

5. The system of claim 4, the controller further effective to calculate the decay constant from the variance associated with the occupancy curve.

6. The system of claim 4, the controller further effective to calculate the gain from the mean associated with the occupancy curve.

7. The system of claim 1, further comprising a motion detector sensitivity control having a sensitivity threshold value, the controller further effective to calculate the sensitivity threshold value from the mean associated with the occupancy curve.

8. An occupancy detection network comprising:
one or more motion detection modules configured to be positioned in each of one or more defined areas and each effective to provide an output signal based on detected motion in an associated area;
one or more sound detection modules configured to be positioned in each of the defined areas and further comprising circuitry effective to
generate an ON output signal when sound is detected in an associated area during an OFF lighting state,
generate an OFF output signal when a timeout period lapses with no sound detected during an ON lighting state,
record time stamps in association with sound detection events, and
automatically adjust the timeout period upon recording new time stamps based on a second order occupancy distribution analysis further including each of the previously recorded time stamps and comprising an occupancy curve having a mean and a variance associated with a Gaussian probability distribution function, the occupancy curve being adjusted for each newly recorded set of time stamps and the timeout period being adjusted according to the mean and variance of the occupancy curve;
each of said motion detection modules and said sound detection modules configured to be assigned an address associated with an area in which they are positioned; and
a central lighting controller configured to be functionally linked to each of the motion detection modules and sound detection modules via a common bidirectional data bus, and effective to control one or more associated lighting devices to be turned on and off in accordance with output signals received from the detection modules.

9. The network of claim 8, the second order distribution analysis comprising calculating the occupancy curve wherein the mean is greater than two times the variance.

10. The network of claim 8, the one or more sound detection modules further comprising an acoustic amplifier having an acoustic gain calculated from the mean associated with the occupancy curve.

11. The network of claim 10, the sound detection module further comprising circuitry effective to constantly decrease the acoustic gain along a decay curve upon tolling of the timeout period, wherein the duration of the timeout period is determined in part by a decay constant associated with the gain.

12. The network of claim 11, the sound detection module further comprising circuitry effective to calculate the decay constant from the variance associated with the occupancy curve.

13. The network of claim 8, the timeout period associated with the sound detection module comprising a first timeout period, the motion detection module further comprising motion detection sensitivity control circuitry effective to
generate an ON output signal when motion is detected in an associated area during an OFF lighting state,
generate an OFF output signal when a second timeout period lapses with no motion detected during an ON lighting state,
record time stamps in association with motion detection events, and
automatically adjust the second timeout period upon recording new time stamps based on a second order occupancy distribution analysis comprising an occupancy curve having a mean and a variance associated with a Gaussian probability distribution function, the occupancy curve being adjusted for each newly recorded set of time stamps and the second timeout period being adjusted according to the mean and variance of the occupancy curve.

14. The network of claim 13, the motion detection sensitivity control circuitry further effective to calculate a motion detection sensitivity threshold value from the mean associated with the occupancy curve.

15. A sound detection module for use with a lighting controller associated with a defined area, the sound detection module comprising:
one or more sound detectors effective to generate signals associated with sound in the defined area; and
sound detection control circuitry effective to
generate an ON output signal to the lighting controller when sound is detected in an associated area during an OFF lighting state,
generate an OFF output signal to the lighting controller when a timeout period lapses with no sound detected during an ON lighting state,
record time stamps in association with sound detection events, and
automatically adjust the timeout period based on a second order occupancy distribution analysis comprising an occupancy curve having a mean and a variance associated with a Gaussian probability distribution function, the occupancy curve including previously recorded time stamps and being adjusted for each newly recorded set of time stamps, and the timeout period being adjusted according to the mean and variance of the occupancy curve.

16. The sound detection module of claim 15, the sound detection control circuitry further comprising an acoustic amplifier having an acoustic gain calculated from the mean associated with the occupancy curve.

17. A motion detection module for use with a lighting controller associated with a defined area, the motion detection module comprising:
a motion detector effective to generate signals associated with motion in the defined area; and motion detection sensitivity control circuitry effective to
- generate an ON output signal to the lighting controller when motion is detected in an associated area during an OFF lighting state,
- generate an OFF output signal to the lighting controller when a timeout period lapses with no motion detected during an ON lighting state,
- record time stamps in association with motion detection events, and
- automatically adjust the timeout period based on a second order occupancy distribution analysis comprising an occupancy curve having a mean and a variance associated with a Gaussian probability distribution function, the occupancy curve including previously recorded time stamps and being adjusted for each newly recorded set of time stamps, and the timeout period being adjusted according to the mean and variance of the occupancy curve.

18. The motion detection module of claim 17, the motion detection sensitivity control circuitry further effective to calculate a motion detection sensitivity threshold value from the mean associated with the occupancy curve.

* * * * *